United States Patent
Matsuzawa et al.

(10) Patent No.: US 6,330,004 B1
(45) Date of Patent: Dec. 11, 2001

(54) MULTIMEDIA PROGRAM EDITING AND PRESENTING SYSTEM WITH FLEXIBLE LAYOUT CAPABILITY BY SIMPLIFIED INPUT OPERATIONS

(75) Inventors: Tomoko Matsuzawa, Tokyo; Toshio Oka, Yokohama; Makoto Sato, Funabashi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/200,869

(22) Filed: Nov. 27, 1998

(30) Foreign Application Priority Data

Nov. 28, 1997 (JP) .................................................. 9-342014

(51) Int. Cl.⁷ .................................. G06F 3/00; G06F 3/14
(52) U.S. Cl. .......................... 345/723; 345/719; 345/764; 345/769; 345/721; 386/52
(58) Field of Search ............................ 345/302, 327–328, 345/333–334, 339–340, 348; 386/52, 55

(56) References Cited

U.S. PATENT DOCUMENTS

| | | | | |
|---|---|---|---|---|
| 5,666,554 | * | 9/1997 | Tanaka | 345/302 |
| 5,675,752 | * | 10/1997 | Scott et al. | 345/333 |
| 5,719,786 | * | 2/1998 | Nelson et al. | 345/327 X |
| 5,745,910 | * | 4/1998 | Piersol et al. | 345/339 X |
| 5,767,846 | * | 6/1998 | Nakamura et al. | 345/302 |
| 5,973,679 | * | 10/1999 | Abbot et al. | 345/302 |
| 6,072,479 | * | 6/2000 | Ogawa | 345/302 |

FOREIGN PATENT DOCUMENTS

| | | |
|---|---|---|
| 0706124 | 4/1996 | (EP) . |
| 0758115 | 2/1997 | (EP) . |
| 0803825 | 10/1997 | (EP) . |
| 6-119229 | 4/1994 | (JP) . |
| 7-287646 | 10/1995 | (JP) . |
| WO 9428480 | 12/1994 | (WO) . |

* cited by examiner

Primary Examiner—Raymond J. Bayerl
Assistant Examiner—X. L. Bautista
(74) Attorney, Agent, or Firm—Lowe Hauptman Gilman & Berner, LLP

(57) ABSTRACT

A multimedia program editing method enables a layout with a higher degree of freedom by simplified input operations. Available media materials and a plurality of predetermined frames are displayed. The user sets a current scenario time to a desired time by clicking on a desired one of a plurality of time control icons, and associates a desired material with one of the predetermined frames at the desired time by mouse operations. In response to the association of the desired material, information on the association is registered to a scenario to prepare for an instruction to present the desired material in one of said predetermined frames. Any attribute of one of the predetermined frames can be changed. If the user terminates the association by specifying the desired material and clicking on a predetermined icon, then the attribute of the one of the predetermined frames is restored to a state before the desired material was attached to the frame.

6 Claims, 7 Drawing Sheets

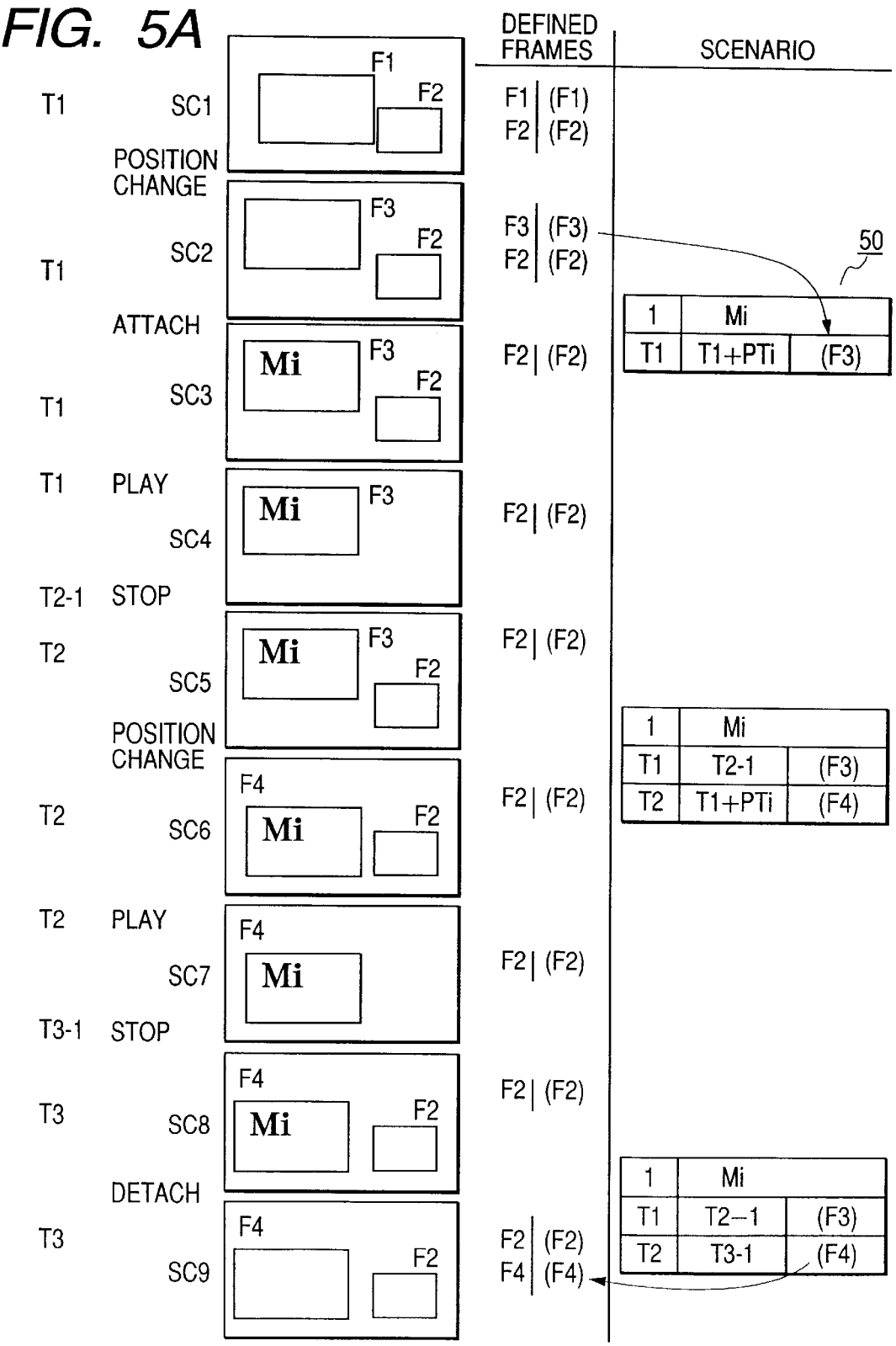

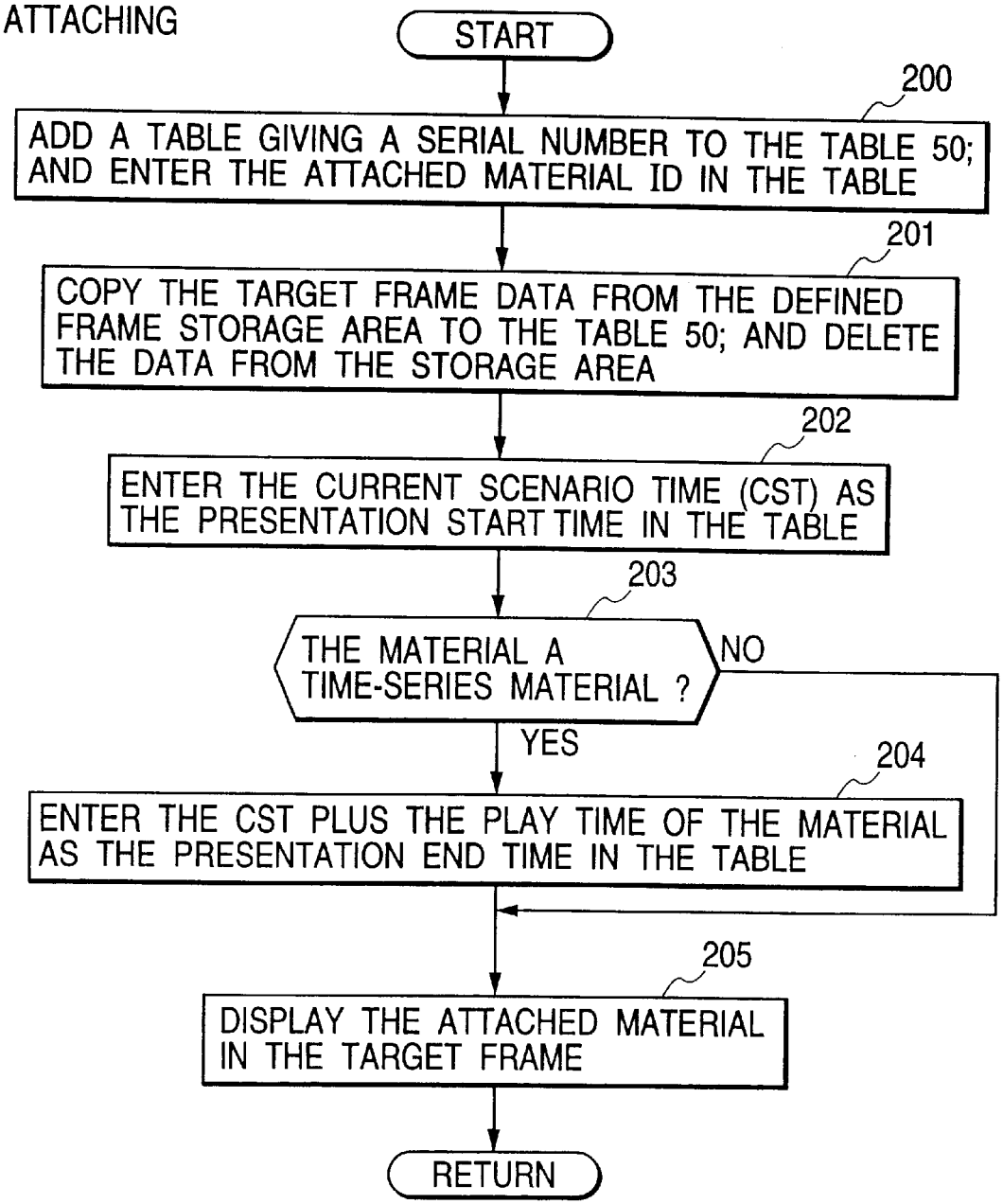

MULTIMEDIA PROGRAM EDITING AND PRESENTING SYSTEM WITH FLEXIBLE LAYOUT CAPABILITY BY SIMPLIFIED INPUT OPERATIONS

BACKGROUND OF THE INVENTION

1. Field of the Invention

The invention generally relates to a multimedia program editing and presenting system and, more particularly, to a method and system for permitting a user to edit a multimedia program or scenario with a higher degree of freedom by simplified operations.

2. Description of the Prior Art

A multimedia computer program or a scenario defines the details of a multimedia application. In editing a multimedia program, the user selects one out of the displayed media materials to assign to a layout window or frame either provided by a prepared template or specified by the user if the selected media material is of a visual type (i.e., any of the video, picture and text types) and to assign to a desired scenario time (or a time measured from the beginning of the scenario) to start replaying the selected material if the selected media material is of the audio type. This process is repeated till a desired scenario is obtained.

The present invention especially relates to a method and system for editing a scenario by using materials of a visual type and frames (or windows) where the materials are to be displayed.

Japanese unexamined patent publication No. Hei 7-287,646 discloses a scenario editing/presenting method and device therefor. A desired number of frames can be defined for a time period from the start time to the end time of each material. This provides full flexibility in defining frames. However, for each of the frames, the user has to specify a start time, the coordinates of the frame position and the size (width, height) at the start time, an end time, the coordinates of the frame position and the size (width, height) at the start time, and the start time.

In some multimedia presentation systems, a template of a frame layout is provided so that the user can create a multimedia application by putting materials in frames that have been provided in the template. In such a system, it can be assumed that the material Ma is put into a frame at a time T0, defined in a scenario (hereinafter referred to as "scenario time"), and the scenario is played and then terminated at a time T1. In this case, if the position of the frame of the material Ma is changed from a first position to a second position at a time T1, even if the scenario time is turned back to T0, the position of the frame remains at the second position. This is because the frames of the system are not controlled in association with time.

It is therefore an object of the invention to provide a multimedia program editing and/or presenting method and system that enables a layout with a higher degree of freedom by simplified input operations.

SUMMARY OF THE INVENTION

According to the invention, a multimedia program editing method that enables a layout with a higher degree of freedom by simplified input operations is obtained. The method comprising the steps of:

displaying available media materials;
displaying a plurality of predetermined frames
permitting a user to set a current scenario time to a desired time by clicking on a desired one of a plurality of time control icons;
permitting the user to associate a desired material with one of the predetermined frames at the desired time by mouse operations;
in response to the associating of the desired material, registering information on the association to a scenario to prepare for an instruction to present the desired material in the one of the predetermined frames;
permitting the user to change an attribute of the one of the predetermined frames;
permitting the user to terminate the association by specifying the desired material and clicking on a predetermined icon; and
in response to the terminating the association, restoring the attribute of the one of the predetermined frames to a state before the desired material was attached to the frame.

If the information is deleted from the scenario by specifying the desired material and clicking on a predetermined icon, then the attribute of the one of the predetermined frames is restored to a state before the desired material was attached to the frame.

If any attribute of a vacant (or not attached) frame is changed, then the attribute of the vacant frame is restored to an original state after playing an attached material.

BRIEF DESCRIPTION OF THE DRAWING

Further objects and advantages of the present invention will be apparent from the following description of the preferred embodiments of the invention as illustrated in the accompanying drawing, in which:

FIGS. 5A and 5B, when vertically combined, constitutes a diagram showing an exemplary editing process based on a user-defined frame layout in the multimedia program editing and presenting system 100;

FIG. 7 is a flowchart showing an attaching operation executed by the controller 110 under the condition of the multimedia editor program 2 according to the illustrative embodiment of the invention;

Throughout the drawing, the same elements when shown in more than one figure are designated by the same reference numerals.

DETAILED DESCRIPTION OF THE PREFERRED EMBODIMENTS

Figure 1:
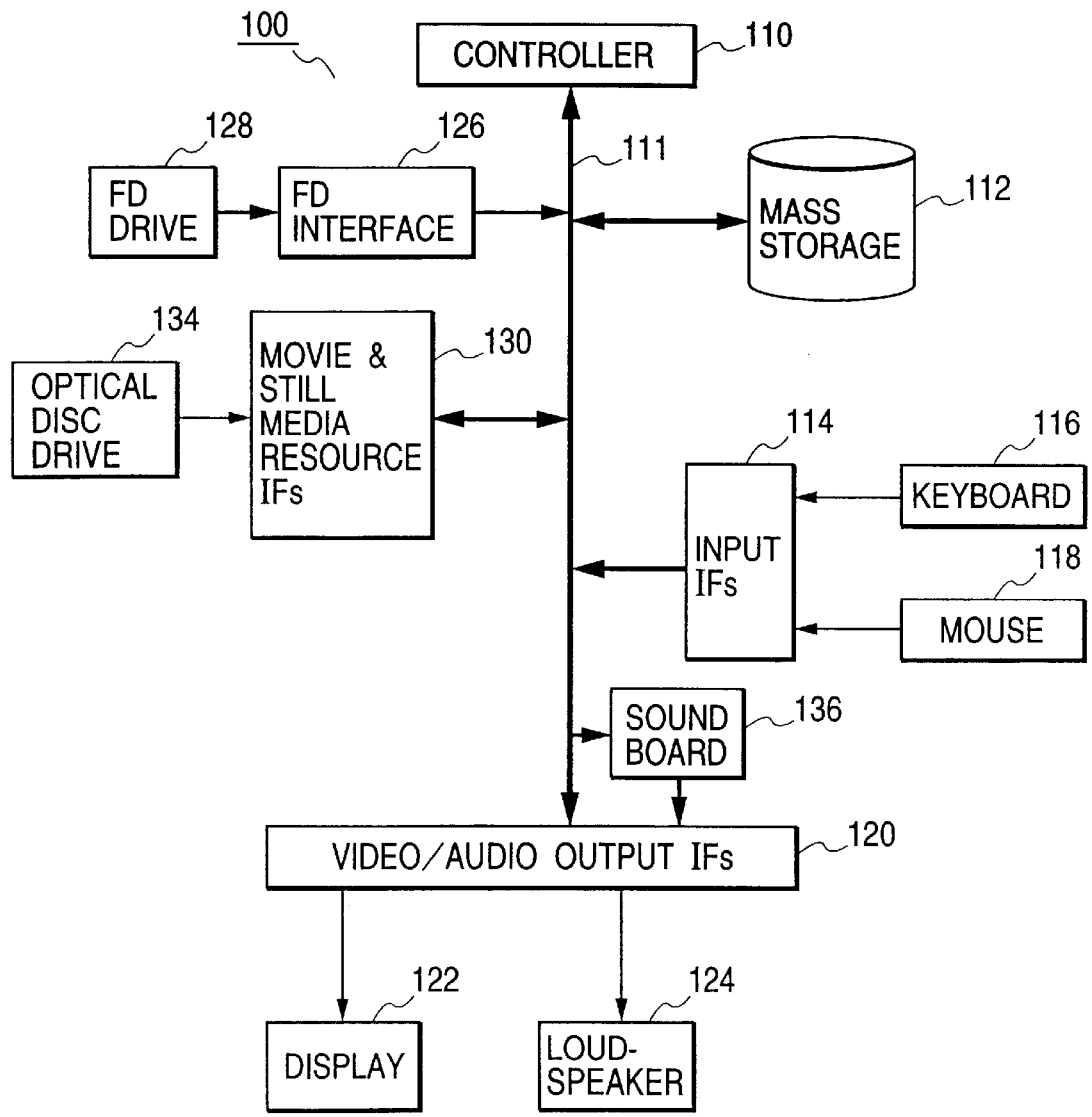
FIG. 1 is a schematic block diagram showing an arrangement of a multimedia editing system 100 according to an illustrative embodiment of the invention.

FIG. 1 is a schematic block diagram showing an arrangement of a multimedia editing system 100 according to an illustrative embodiment of the invention. In FIG. 1, the video editing system 100 is a computer-based system which comprises a controller 100 including a central processing unit (not shown), a read only memory (not shown) and a random access memory (not shown) which are interconnected through a system bus 111; a mass storage device 112; a keyboard 116 and a mouse 118 connected through input interfaces (IFs) 114; a display device 122 and a loudspeaker 124 connected through a video/audio interface 120; and a FD (floppy disc) drive 128 connected through FD interface 126. The video editing system 100 further comprises an optical disc drive 134 which plays an optical disc such as a video-CD (video-compact disc), a PhotoCD, etc. The optical disc drive 134 is connected to the system bus 111 through a movie and still media resource interfaces 130. The system 100 further comprises a sound board 136 which provides an audio output function.

Figure 2:
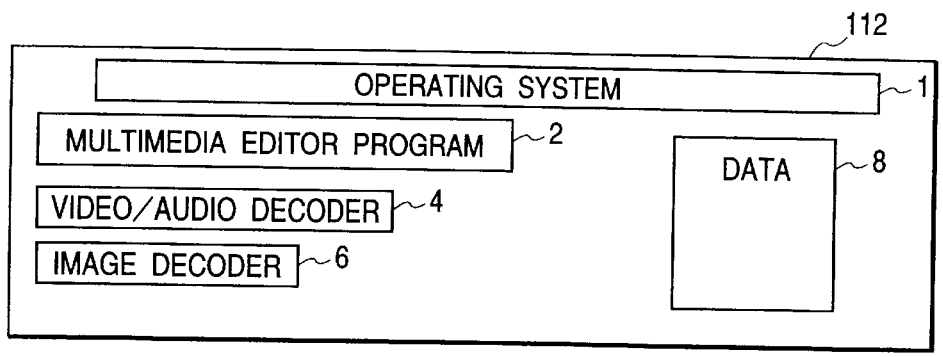
FIG. 2 is a diagram showing exemplary contents of the mass storage device 112 of FIG. 1.

FIG. 2 is a diagram showing exemplary contents of the mass storage device 112 of FIG. 1. The mass storage device 112 stores an operating system 1. The operating system 1 may be any suitable operating system whether it is a tailored or standard one. The storage device 112 stores not only a multimedia editor program 2 according to the embodiment of the invention but also an audio/video decoder 4 such as an MPEG (Moving Picture Experts Group) decoder and an image decoder 6 for a still picture of a format such as JPEG, PhotoCD, etc. This enables the multimedia editing system 100 not only to create a multimedia application but also to play the created application. Also, The storage device 112 stores various data 8 including media materials for use in scenario editing.

Figure 3:
FIG. 3 is a diagram showing an exemplary structure of a media material table or file 20 which stores information on the media materials prepared for a certain multimedia title to be created.

FIG. 3 is a diagram showing an exemplary structure of a media material table or file 20 which stores information on the media materials prepared for a certain multimedia title to be created. Each of the records of the media material table comprises a material ID field, a media type field, media format field, a play time field, etc. The media type field contains a value indicative of any of the movie, still, text and audio types. The play time field contains the play time of the material if the material is either of the movie type or of the audio type, and the length in byte if the material is of the text type.

Figure 4:
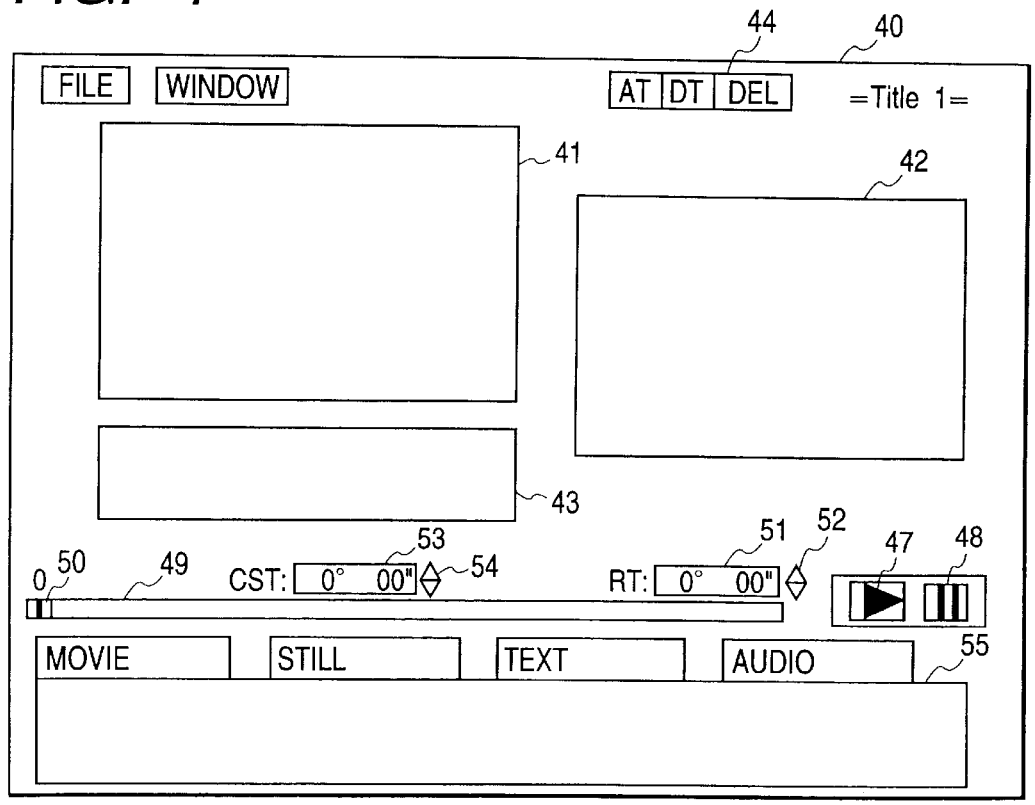
FIG. 4 is a diagram showing an exemplary screen displayed when the multimedia editing system 100 is in an editing mode.

FIG. 4 is a diagram showing an exemplary screen displayed when the multimedia editing system 100 is in an editing mode. There are shown presentation frames 41 through 43 in which a moving picture (or movie) material, a still picture material and a text material are presented. The presentation frames 41 through 43 may be given as one of templates provided by the system 100 and/or preset by the user. Alternatively, the presentation frames 41 through 43 may be defined by the user. Defining the presentation frames can be achieved by simple mouse 118 operations in a like manner as practiced in figure drawing software. The screen 40 includes a play icon 47 to preview a scenario in course of editing or to play a completed scenario, a stop icon 48 to stop previewing or playing the scenario, a scroll bar 49 and scroll box 50 that roughly indicates the running time (RT) of the scenario and the current scenario time (CST) or the current temporal position in scenario by the scroll box 50 moving with the advance of scenario by playing. The user can roughly set the current scenario time (CST) by dragging the scroll box 50. The screen 40 further includes precise indications of RT 51 and CST 53 and respective pairs 52 and 54 of up and down icons for precise setting RT 51 and CST 53 to desired values. At the bottom of the screen 40, there is a media material display area 55 where available media materials are displayed.

The system 100 operates in either an edit mode or a presentation mode. The following description will be focused on the edit mode.

For the sake of better understanding the present invention, it is useful to describe basic concepts of the multimedia editor program 2 according to the principles of the invention. The editing is performed either on the basis of a user-defined frame layout or on the basis of a selected template. In a template-based editing, the user is prohibited from changing any attributes (e.g., the position, the size, etc.) of a vacant presentation frame.

The presentation of any material is begins at the time of attaching of the material and ends at the time of detaching of the material. The attaching and the detaching are either programmed by the designer in case of a noninteractive or sequentially-presented multimedia application or caused by viewer's selection of a menu item, clicking on a control icon and so on in case of an interactive multimedia application. A visual material, i.e., a material of the movie, still or text type is attached to a desired frame 41, 42 or 43 at a scenario time at which the user desires to start playing the visual material. In order to achieve this, the user first sets the CST indicator 53 to the desired scenario time either by stopping the previewing of the scenario at the desired time with the stop icon 48 or by dragging the scroll box 50 or clicking on the CST setting icon pair 54 till the CST indicator 53 reads the desired scenario time; select a desired visual material in the available material display area 55: select a desired presentation frame 41, 42 or 43; and clicks on the AT icon 57.

An audio material is attached to a scenario time at which the user desires to start playing the audio material. In order to achieve this, the user first sets the CST indicator 53 to the desired scenario time in the same manner as described-above; selects a desired audio material in the available material display area 55; and clicks on an AT icon 57.

The media materials of each type are separately attached in order of time to be presented.

Figure 5B:
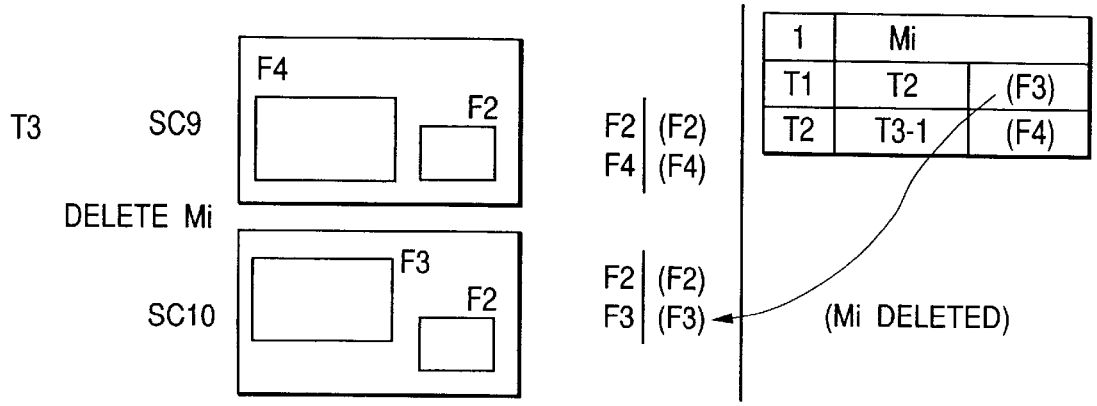

If a material is detached at a certain scenario time (say, at Ti), the playing of the material is terminated just before the detached scenario time (at (Ti−1) in this example) so that another material of the same material type can be attached at the detached scenario time. The time of detaching defines the presentation end FIGS. 5A and 5B, when vertically combined, constitutes a diagram showing an exemplary editing process based on a user-defined frame layout in the multimedia program editing and presenting system 100. In FIG. 5, T1 through T3 in the first column are scenario times; the second column shows user's operations, the third column shows displayed screens, the DEFINED FRAMES column shows the contents of a defined frame storage area in the controller 110, the SCENARIO column shows a schedule table of a material Mi which is registered in the scenario under editing. It is noted that the scenario time is advanced only by previewing or playing the scenario with the preview icon 47 or by controlling the scenario time controlling icon 53.

It is seen from the screen SC1 that the user has defined two frames F1 and F2. Defining a frame (e.g., Fi) is easily achieved by dragging the mouse 118 from one end (e.g., Pia) of a diagonal of the frame to the other end thereof (e.g., Pib). In response to the definition of the frames F1 and F2, the controller 110 stores the frame ID F1 and F2 and respective diagonal point pairs of coordinates, e.g., $\{(X1a, Y1a), (X1b, Y1b)\}$ and $\{(X2a, Y2a), (X2b, Y2b)\}$. It should be noted that a frame Fi may be any polygon defined by N points $\{(Xi1, Yi1), (Xi2, Xi2), \ldots ,(XiN, YiN)\}$. For the purpose of simplicity, these coordinate expressions of a frame Fi are hereinafter denoted en bloc as (Fi).

In an editing process based on a user-defined frame layout, the user is permitted to change the attribute (the position and/or size) of a vacant frame. If the frame attribute is changed, the old frame data is overwritten by the new frame data. For example, the position of the frame F1 has been changed in screen SC2. Responsively, the frame F1 has been changed to F3 in the defined frame storage area. Then a media material Mi is attached to the frame F3 at T1. FIG. 7 is a diagram showing an attaching operation executed by the controller 110 under the condition of the multimedia editor program 2 according to the illustrative embodiment of the invention. In FIG. 7, controller 110 adds a schedule table 50 giving a serial number to the table 50; enters the attached material ID (mi in this example) in step 200. In step 201, controller 110 copies the geometrical data of target frame (F3 in this case) from the defined frame storage area (no shown) to the schedule table 50 and deletes target frame data from the storage area. In step 202, controller 110 enters the current scenario time (CST) (T1 in this case) as the presentation start time in the table. In step 203, controller 110 makes a test to see if the material Mi is a time-series material or a material with a time axis. If so, controller 110 enters the CST plus the play time of the material as the presentation end time in the table 50 in step 204 and proceeds to step 205. Otherwise, controller 110 proceeds to step 205. If a material is attached to a frame in the editing mode, controller 110 displays the attached material (Mi) in the target frame in step 205 and returns to the program 2. The presentation start time, the presentation end time and the target (or attached) frame constitutes a record of the schedule table 50.

Figure 8:
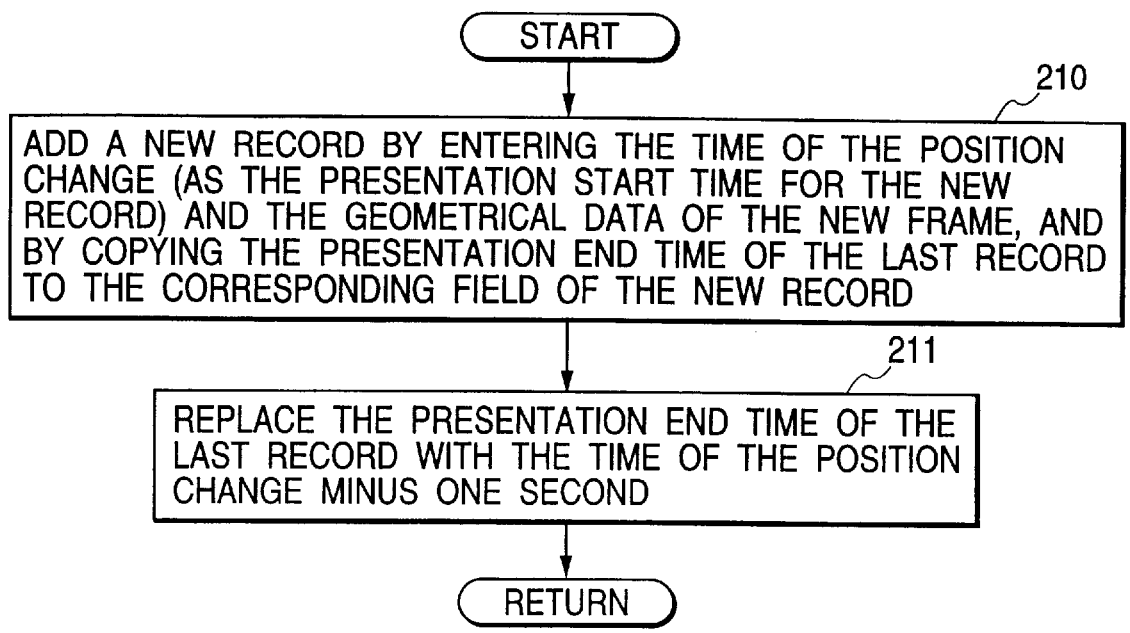
FIG. 8 is a flowchart showing a position change operation, for the attached frame, executed by the controller 110.

Though the vacant frame is usually displayed in the editing mode, the vacant frame is not displayed during the previewing period as shown in the screen SC4. When the previewing is stopped at a scenario time T2, the vacant frame is displayed again. The position of the frame f3 is changed from SC5 to SC6. FIG. 8 is a flowchart showing a position change operation, for the attached frame, executed by the controller 110. In step 210, controller 110 adds a new record by entering the time of the position change (as the presentation start time for the new record) and the geometrical data of the new frame, and by copying the presentation end time of the last record to the corresponding field of the new record. In step 211, controller 110 replaces the presentation end time of the last record with the time of the position change minus one second and returns to the program 2.

Figure 9:
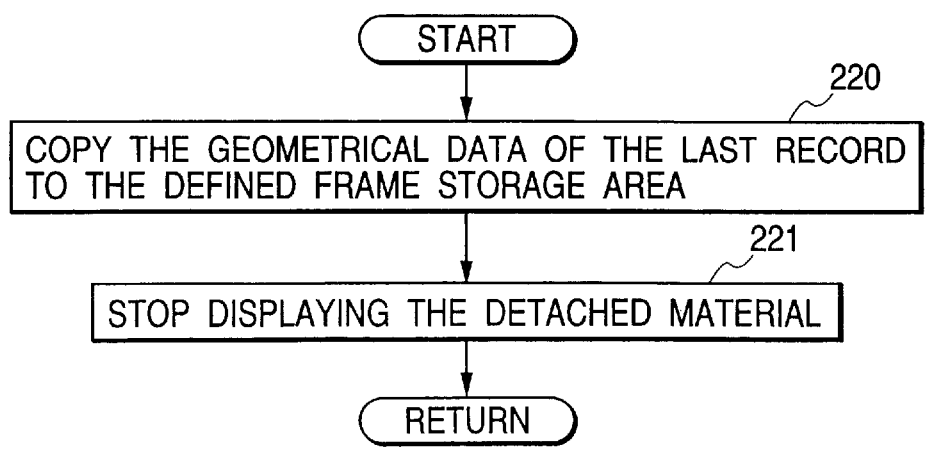
FIG. 9 is a flowchart showing a detaching operation executed by the controller 110 under the condition of the multimedia editor program 2 according to the illustrative embodiment of the invention.

At time T3, the material Mi is detached from the frame F4. FIG. 9 is a flowchart showing a detaching operation executed by the controller 110. in step 220, controller 110 copies the geometrical data of the detached frame (F4 in this case) of the last record to the defined frame storage area. In this way, an attached frame keeps its position after being detached in the editing based on a user defined layout. In step 221, controller 110 stops displaying the detached frame F4 as shown in the screen SC9.

If the user clicks on the delete button 44 while selecting a material that has been attached, then the schedule table 50 is deleted from the scenario. In this case, the geometrical data of the attached frame of the first record (F3 in this case) is copied to the defined frame storage area. Thus, if the attached material is deleted from the scenario, then the frame having been attached restores the position just before the material has been attached.

Figure 6B:
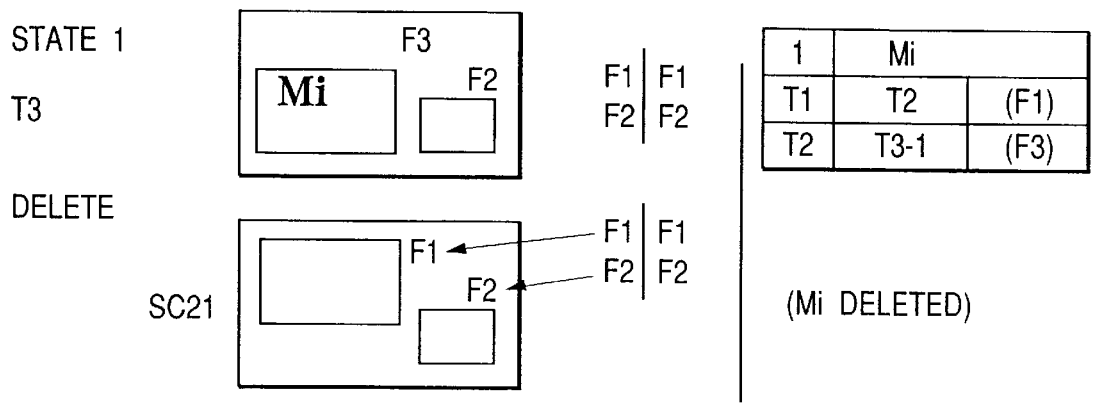
FIGS. 6A and 6B, when vertically combined, constitutes a diagram showing an exemplary editing process based on a template in the multimedia program editing and presenting system 100.
Figure 6A:
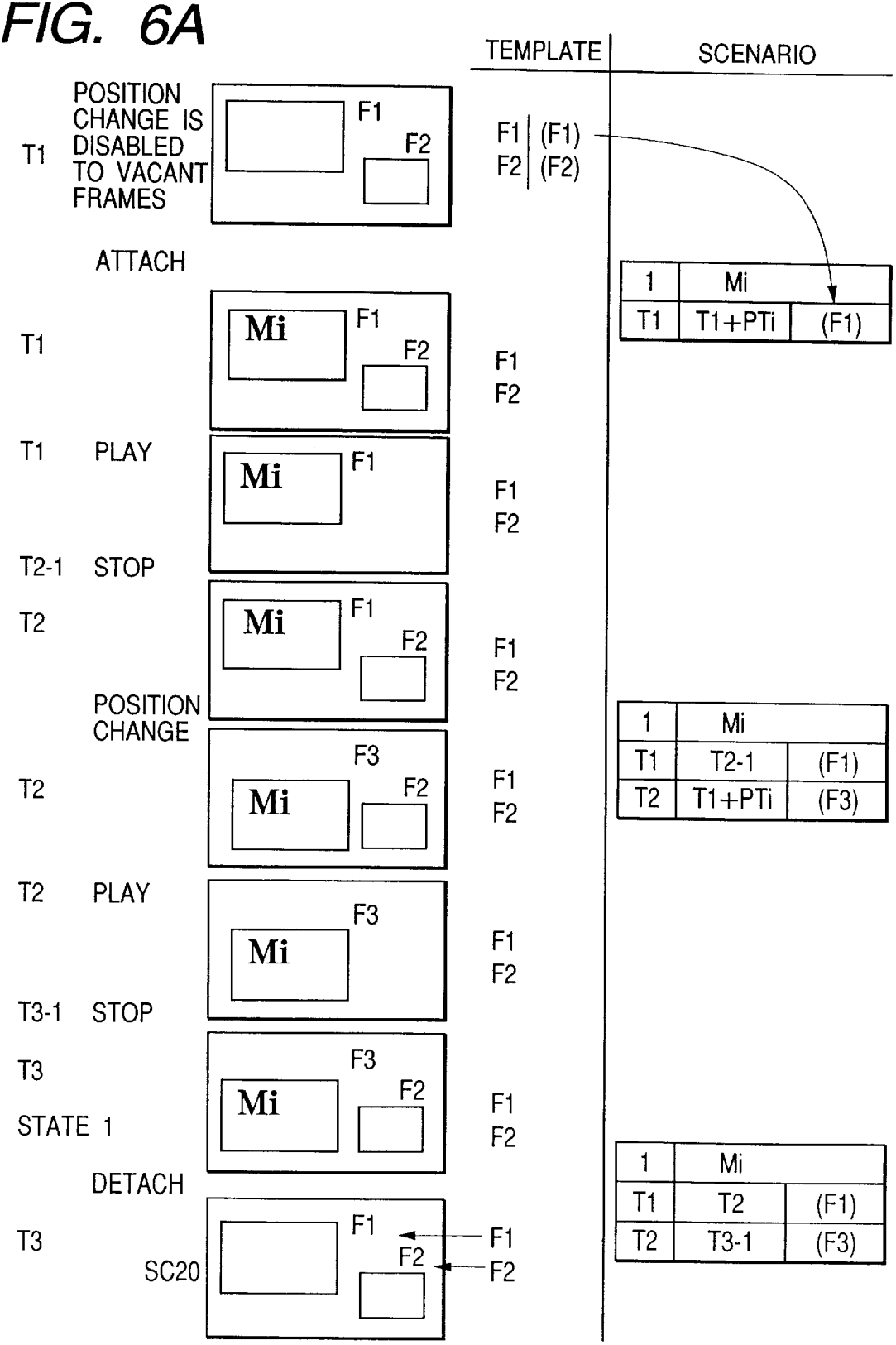

FIGS. 6A and 6B, when vertically combined, constitutes a diagram showing an exemplary editing process based on a template in the multimedia program editing and presenting system 100. FIG. 6 is identical except that changing the vacant frame position is prohibited; a template is uses in stead of a user-defined layout; and accordingly the detaching and the deleting causes the detached or deleted material to restore the position defined by the template as shown in screens SC20 of FIG. 6A and SC21 of FIG. 6B, respectively.

As described above, the multimedia editing and presenting system enables flexible editing operation by simplified mouse operations.

The user is prohibited from changing any attribute of a vacant frame in the template-based editing. Alternatively, if the user has changed any attribute of a vacant frame in the template-based editing, the change is neglected after playing a material, i.e., the vacant frame restores its original position after a play of a material.

Many widely different embodiments of the present invention may be constructed without departing from the spirit and scope of the present invention. It should be understood that the present invention is not limited to the specific embodiments described in the specification, except as defined in the appended claims.

What is claimed is:

1. A multimedia program editing method that enables a layout with a higher degree of freedom by simplified input operations, the method comprising the steps of:

displaying available media materials;

displaying a plurality of predetermined frames permitting a user to set a current scenario time to a desired time by clicking on a desired one of a plurality of time control icons;

permitting the user to associate a desired material with one of said predetermined frames at said desired time by mouse operations;

in response to said associating said desired material, registering information on said association to a scenario to prepare for an instruction to present said desired material in said one of said predetermined frames;

permitting the user to change an attribute of said one of said predetermined frames;

permitting the user to terminate said association by specifying said desired material and clicking on a predetermined icon; and in response to said terminating said association, restoring said attribute of said one of said predetermined frames to a state before said desired material was attached to the frame.

2. A multimedia program editing method as defined in claim 1, further comprising the steps of:

permitting the user to delete said information from said scenario by specifying said desired material and clicking on a predetermined icon; and in response to said deletion of said information, restoring said attribute of said one of said predetermined frames to a state before said desired material was attached to the frame.

3. A multimedia program editing method as defined in claim 1, further comprising the steps of:

permitting the user to change any attribute of a vacant (or not attached) frame; and restoring said any attribute of said vacant frame to an original state after playing an attached material.

4. A multimedia program editing system that enables a layout with a higher degree of freedom by simplified input operations, the system comprising:

means for displaying available media materials;

means for displaying a plurality of predetermined frames;

means for setting a current scenario time to a desired time by clicking on a desired one of a plurality of time control icons;

means for associating a desired material with one of said predetermined frames at said desired time by mouse operations;

means, responsive to said associating said desired material, for registering information on said association to a scenario to prepare for an instruction to present said desired material in said one of said predetermined frames;

means for changing an attribute of said one of said predetermined frames;

means for terminating said association by specifying said desired material and clicking on a predetermined icon; and means, responsive to said terminating said association, for restoring said attribute of said one of said predetermined frames to a state before said desired material was attached to the frame.

5. A multimedia program editing system as defined in claim 4, further comprising:

means for deleting said information from said scenario by specifying said desired material and clicking on a predetermined icon; and means, response to said deletion of said information, for restoring said attribute of said one of said predetermined frames to a state before said desired material was attached to the frame.

6. A multimedia program editing system as defined in claim 4, further comprising:

means for changing any attribute of a vacant (or not attached) frame; and means for restoring said any attribute of said vacant frame to an original state after playing an attached material.

* * * * *